United States Patent

Chan

[11] 3,819,537
[45] June 25, 1974

[54] CATALYTIC ALLOY OF SILVER AND TIN FOR THE PRODUCTION OF ETHYLENE OXIDE FROM ETHYLENE

[75] Inventor: Pierre Edouard Chan, Geneva, Switzerland

[73] Assignee: Montecatini Edison S.P.A., Milan, Italy

[22] Filed: Aug. 18, 1971

[21] Appl. No.: 172,896

[30] Foreign Application Priority Data
Sept. 16, 1970  Switzerland...................... 13716/70

[52] U.S. Cl. .......................... 252/476, 260/348.5 R
[51] Int. Cl. .............................................. B01j 11/08
[58] Field of Search 252/476; 260/348.5 R, 348.5 F; 75/173 R

[56] References Cited
UNITED STATES PATENTS
1,998,878   4/1935   Lefort .................... 260/348.5 R
2,426,761   9/1947   Cambron et al. .............. 252/476 X
2,837,473   6/1958   MacCormack et al. ...... 260/348.5 R
3,144,416   8/1964   Hosoda et al. ..................... 252/476
3,560,530   2/1971   Stiles ............................. 252/476 X
3,664,970   5/1972   DeMaio ......................... 252/476 X Primary Examiner—Daniel E. Wyman
Assistant Examiner—W. J. Shine
Attorney, Agent, or Firm—Karl F. Ross; Herbert Dubno

[57] ABSTRACT

A catalyst for the production of ethylene oxide by oxidation of ethylene with oxygen, comprising a composition of silver and tin, having a tin content corresponding to an amount of between $5 \cdot 10^{-5}$ (0.005 percent) and $5 \cdot 10^{-2}$ (5 percent) by weight of the silver.

1 Claim, No Drawings

CATALYTIC ALLOY OF SILVER AND TIN FOR THE PRODUCTION OF ETHYLENE OXIDE FROM ETHYLENE

This invention relates to a catalyst for the production of ethylene oxide by oxidation of ethylene with oxygen.

The process hitherto used for the production of ethylene oxide by oxidation of ethylene consists in a catalytic oxidation of the ethylene with oxygen at a temperature between 300° and 750°F, preferably between 500° and 555°F. However, the catalysts hitherto used for this purpose have a rather limited activity and selectivity. Thus, for the production of ethylene oxide with a sufficient output per unit time it is necessary to recycle the reaction mixture in order to bring it several times into contact with the catalysts. This involves an increase in the size and complexity of the plant required to produce a given output and also an increase of the required power. The use of a catalysts more active and more selective than those hitherto used would limit the number of the recycling steps and consequently would increase the productivity of the process.

It is therefore an object of the present invention to provide a catalyst which is more active and more selective than those hitherto employed.

To achieve this object the catalyst according to the invention comprises a composition of silver and tin, having a tin content corresponding to an amount of between $5.10^{-5}$ (0.005 percent) and $5.10^{-2}$ (5 percent) by weight of the silver, the silver being in the metal state and/or contained in or combination capable of releasing this element in the metal state while the tin is in the metal state and/or in the form of oxide and/or contained in a combination capable of releasing this element in the metal state or in the form of its oxide.

The silver-tin composition is preferably at least partly in the form of an alloy. However, a mixture of these two metals at a mixing ratio as indicated above has practically the same catalytic effect as the corresponding alloy, probably because of the conversion of the mixture into an alloy.

The question whether the tin is in the metal state or in the form of an oxide when the catalyst is in a catalytically active state could not be resolved and is difficult to explain. It is however known that, although the tin oxide alone has no catalytic activity, the tin could be at least partly present in the oxidized state in the active catalyst.

The catalyst may consist only of a composition of silver and tin or may be provided with an inert support designed to give it the mechanical and thermal properties required for its industrial utilization.

An alloy of silver and tin having the composition indicated above may be prepared by simply melting the two metals in the absence of oxygen. Such melting may be carried out either under vacuum, for example, at a pressure below $10^{-3}$ torr, or at atmospheric pressure in the presence of an inert atmosphere formed, for example, of a rare gas such as argon or helium. This alloy may be used in a more or less broken-up form, for example, in the form of powder, chips, strips, threads or the like. This alloy may also be applied to an inert support without catalytic activity.

The mixture of silver and tin may also be a mixture of a powder of these metals. Also an agglomerate of these metals may be used which is produced mechanically by putting together two bodies each made of one of these metals and applying to the contact surface therebetween a sufficient force so that the small amount of tin corresponding to its share in the alloy will adhere to the silver body. Also an agglomerate may be used which is made by a physical method, particularly by evaporation and condensation under vacuum of the tin, or by electrolysis so as to form a layer of the tin on a substrate at least the surface portion of which is formed of pure silver. The substrate may be, for example, a silver thread or an inert material having a hollow shape or a body having a smooth surface and coated with a layer of pure silver.

The treatment which transforms at least partially the mixture of silver and tin or compounds of these metals into an alloy of the composition indicated above may be a heating treatment in which the mixture or compound is heated to a temperature sufficient to produce the thermal decomposition or, as the case may be, the reduction or oxidation of the compounds of silver and tin. Thus this treatment may comprise a heating in a neutral, reducing or oxidizing atmosphere, and only serves to spread the tin in the silver.

For example, if the catalytic substance is a mixture of silver and tin, this mixture need only be heated in an inert atmosphere or under vacuum to a temperature between about 930° and 1110°F for some minutes to impart to the catalyst its final catalytic power or a power approaching its final catalytic power. Such a treatment, which might be called a catalyst forming treatment, may also be carried out directly within the reactor under the same or like conditions as those occuring in the oxidation of the ethylene. The spreading of the tin within the silver may take place at a considerable speed during the very preparation of the agglomerate of silver and tin if the temperature at which this preparation is carried out is relatively high, for example, about 480°F.

This invention also relates to a process for the production of the catalyst described above. This process comprises placing on a substrate, at least the surface portion of which is formed of silver, a layer of tin of a thickness such that the amount of the tin in the agglomerate thus obtained will correspond to a tin content of between 0.005 and 5 percent by weight in relation to the silver.

This process affords particular advantages for it imparts to the catalyst not only the desired composition but also a well defined structure so as to produce a catalyst having the best possible activity and selectivity.

Some examples for producing the catalyst according to the invention will now be described in detail.

EXAMPLE 1

9.9 g. of pure silver containing less than 10 ppm. by weight of other elements, and 0.1 g. of tin having a purity of 99.9 percent, were charged into a quartz flask previously well cleaned and degassed. Then a vacuum of $10^{-6}$ torr was produced in the flask and the flask sealed by fusion. The metal mixture was melted by heating it to 1,832°F for 15 minutes while agitating the flask to produce a small ingot of a very homogeneous alloy of silver and tin, containing 1 percent by weight of tin. This ingot was broken up into small filing chips having a length of between 0.8 and 1.6 mils.

EXAMPLE 2

The same steps as described in Example 1 were repeated except that 9.99 g. of silver and 0.01 g. of tin were used. The obtained alloy chips contained 0.1 percent by weight of tin.

EXAMPLE 3

Threads of pure silver (with less than 10 ppm. of foreign elements) having a diameter of 0.012 in. were coated with a tin layer to a medium thickness of 60 A by evaporation under reduced pressure under the following conditions:

Apparatus used: A Pyrex glass bell provided with a device for evaporating tin by heating, formed of a tungsten crucible serving simultaneously as an electric resistance and for receiving tin powder.

Heating temperature: 1832°F.
Heating time: 1 minute
Initial pressure in the evaporating chamber: $10^{-5}$ torr.
Atmosphere: Air in an amount corresponding to the residual vacuum.
Initial temperature of the substrate: Ambient temperature.

EXAMPLE 4

The steps of Example 3 were repeated, but with an evaporating time of 8 minutes so that a tin layer having a thickness of 480 A is applied.

As a catalyst the threads prepared as described in Examples 3 and 4 were used without subjecting them to any preliminary forming treatment. The formation of the catalyst takes place directly within the reactor and with great speed even while the catalyst is used.

The following comparative tests show that the catalyst according to the invention has a greater activity and selectivity than the conventional catalysts.

A gas mixture formed of 30.5 cu.in. of oxygen and 10.3 cu.in. of ethylene (as measured under normal temperature and pressure conditions) was subjected to a recycling treatment for 12 minutes in a recycling test reactor working at an absolute pressure of 17.11 lbs.p.sq.in. The reactor was provided with a U-shaped tube coated with an amount of catalyst corresponding to an active surface of 3.1 sq.in. and maintained at a temperature of 536°F. The flow rate of the gas mixture was 1 liter (35.2 Brit. fl.oz.) per minute (as measured under normal temperature and pressure conditions).

The ethylene oxide produced in the course of the test was continuously separated from the reaction mixture by condensing it to the liquid state in a trap cooled down to -108°F by a mixture of dry ice and ethyl alcohol so that the gas mixture when entering into contact with the catalyst practically no longer contained any ethylene oxide.

After 2 hours of recycling the gas mixture and the catalyst were cooled down to ambient temperature and all condensable gases contained in the mixture were condensed at the temperature of liquid air. Then the condensate was left to return to ambient temperature and the amount of ethylene oxide was ascertained by chromatography in the gaseous phase.

The results of various tests, in which the catalysts prepared according to the above examples are compared with thread of pure silver, are indicated in the following table.

| Type of catalyst | Number of ppm. (by volume) OF ETHYLENE OXIDE |
| --- | --- |
| Catalyst of Example 1 | 3.000 |
| Catalyst of Example 2 | 40.000* |
| Catalyst of Example 3 | 17.000 |
| Catalyst of Example 4 | 1.500 |
| Thread of pure silver (diameter 0.012 in.) | 10 |

* = median value of several tests

I claim:

1. A process for the production of a silver-tin catalyst for the oxidation of ethylene with an oxygen-containing gas at a temperature of substantially 150° to 400°C to produce ethylene oxide, said process comprising the steps of:
   a. alloying tin with silver by plating a layer of tin onto a silver body to form a catalyst containing tin in an amount of 0.005 percent to 5 percent by weight of the silver; and
   b. activating the catalyst produced in step (a) by treating same with an inert atmosphere at a temperature between 930° and 1110°F.

* * * * *